United States Patent
Baek

(10) Patent No.: US 12,540,986 B2
(45) Date of Patent: Feb. 3, 2026

(54) POWER SUPPLY DEVICE, OPERATION METHOD THEREOF, AND DISPLAY DEVICE

(71) Applicant: LG ELECTRONICS INC., Seoul (KR)

(72) Inventor: Seunghun Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/864,282

(22) PCT Filed: May 12, 2022

(86) PCT No.: PCT/KR2022/006814
§ 371 (c)(1),
(2) Date: Nov. 8, 2024

(87) PCT Pub. No.: WO2023/219186
PCT Pub. Date: Nov. 16, 2023

(65) Prior Publication Data
US 2025/0306125 A1    Oct. 2, 2025

(51) Int. Cl.
*G01R 31/40*    (2020.01)
*G01R 31/64*    (2020.01)
(Continued)

(52) U.S. Cl.
CPC ............. *G01R 31/40* (2013.01); *G01R 31/64* (2020.01); *H02M 1/32* (2013.01); *H02M 1/4225* (2013.01); *H02M 1/44* (2013.01)

(58) Field of Classification Search
CPC ...................................................... G01R 31/40
See application file for complete search history.

(56) References Cited

U.S. PATENT DOCUMENTS 8,564,982 B2 * 10/2013 Song .................. H02M 1/4225
                                                        363/44
9,653,984 B2 *  5/2017 Patel ..................... H02M 1/126
(Continued)

FOREIGN PATENT DOCUMENTS

KR    10-2016-0025599    3/2016

OTHER PUBLICATIONS

European Patent Office Application Serial No. 22941773.8, Search Report dated Jun. 10, 2025, 9 pages.
(Continued)

*Primary Examiner* — Daniel Kessie
(74) *Attorney, Agent, or Firm* — LEE, HONG, DEGERMAN, KANG & WAIMEY

(57) ABSTRACT

A power supply device comprises: an EMI filter; a rectification unit for rectifying an AC voltage that has passed through the EMI filter; a power factor correction unit for carrying out power factor correction for the rectified voltage, thereby outputting a DC voltage; and a control circuit for controlling the power factor correction unit. The power factor correction unit comprises: a capacitor connected to an output terminal of the rectification unit; an inductor connected in parallel to the capacitor; and a switch connected in parallel to the inductor. The control circuit may acquire whether the capacitor is abnormal or not, on the basis of a detection signal detected from the inductor, and control the switching of the switch differently according to whether the capacitor is abnormal or not.

20 Claims, 16 Drawing Sheets

(51) Int. Cl.
 *H02M 1/32* (2007.01)
 *H02M 1/42* (2007.01)
 *H02M 1/44* (2007.01)

(56) References Cited

U.S. PATENT DOCUMENTS

| | | | |
|---|---|---|---|
| 9,820,351 B1* | 11/2017 | Xiong | H05B 47/20 |
| 10,890,961 B2 | 1/2021 | King et al. | |
| 2009/0257258 A1* | 10/2009 | Ayukawa | H02M 1/42 |
| | | | 363/89 |
| 2016/0268918 A1 | 9/2016 | Wang et al. | |
| 2017/0366090 A1* | 12/2017 | Sugawara | H02M 3/156 |
| 2018/0062557 A1 | 3/2018 | Tao et al. | |
| 2020/0328672 A1 | 10/2020 | Li et al. | |
| 2021/0194352 A1 | 6/2021 | Jang et al. | |
| 2023/0299687 A1* | 9/2023 | Shao | H02M 3/1586 |

OTHER PUBLICATIONS

Korean Intellectual Property Office Application No. 10-2024-7036957, Office Action dated Jun. 24, 2025, 4 pages.

* cited by examiner

POWER SUPPLY DEVICE, OPERATION METHOD THEREOF, AND DISPLAY DEVICE

CROSS-REFERENCE TO RELATED APPLICATION(S)

This application is the National Stage filing under 35 U.S.C. 371 of International Application No. PCT/KR2022/006814, filed on May 12, 2022, the contents of which is hereby incorporated by reference herein in its entirety.

TECHNICAL FIELD

Embodiments relate to a power supply device, an operation method thereof, and display device.

BACKGROUND ART

Recently, various types of display devices are being developed and distributed due to the advancement of electronic technology, and the demand for large display devices is increasing.

In particular, as display devices become larger, power consumption increases, and large display devices are provided with a power supply device including a power factor correction (PFC) circuit and an EMI filter to stably supply high power consumption.

The PFC circuit is provided with a capacitor and a switch used for power factor compensation. The capacitor is opened due to external factors such as cracks caused by external impact or component failure such as capacity reduction caused by internal foreign substances. In this way, when the capacitor is opened, the operating frequency of the switch is changed due to a change in the input voltage.

If the changed operating frequency resonates with the cut-off frequency of the EMI filter, the EMI filter is heated, causing damage to the EMI filter or burning or damaging the power line connected to the EMI filter or electronic components around the EMI filter, which may lower product reliability.

INVENTION

Technical Problem

An object of embodiments is to provide a power supply device, an operation method thereof, and a display device capable of improving product reliability by quickly identifying an abnormality of a capacitor and taking measures accordingly to prevent heat generation of an EMI filter.

Another object of the embodiments is to provide a power supply device, an operation method thereof, and a display device capable of improving the accuracy of determining whether a capacitor is abnormal by using a learning model.

Technical Solution

In order to achieve the above and other objects, according to an aspect of embodiments, a power supply device may include an EMI filter; a rectifier configured to rectify an AC voltage passing through the EMI filter; a power factor compensation unit configured to compensate power factor of the rectified voltage and output a DC voltage; and a control circuit configured to control the power factor compensation unit, wherein the power factor compensation unit may include: a capacitor connected to an output terminal of the rectifier; an inductor connected in parallel with the capacitor; and a switch connected in parallel with the inductor; wherein the control circuit may be configured to: obtain whether the capacitor is abnormal based on a detection signal detected from the inductor, and control switching of the switch differently depending on whether the capacitor is abnormal.

The control circuit may include a first terminal configured to receiving a detection signal detected from the inductor; and a second terminal configured to output a first switching control signal or a second switching control signal generated based on the detection signal to the switch.

The control circuit may be configured to: control the switching of the switch according to the first switching control signal to charge and discharge energy to the inductor when the capacitor is normal. The first switching control signal may include a control signal that periodically has a first level and a second level different from the first level.

The control circuit may be configured to: stop the operation of the switch according to the second switching control signal based on there being a problem with the capacitor. The second switching control signal may include a control signal having a constant level.

The control circuit may be configured to: acquire whether the detection signal detected from the inductor is received through the first terminal, and based on the detection signal being not received, and based on the section in which the detection signal is not received being longer than a preset reference section, determine that there is a problem with the capacitor. The control circuit may be configured to: based on the number of times the detection signal is not received being a preset reference number or greater, determine that there is a problem with the capacitor.

The power supply device may further include a memory configured to store a reference setting learning model, and the control circuit may be configured to: monitor a surrounding power situation, learn the reference setting learning model by inputting a preset reference section, a preset reference number of times, and the monitored surrounding power situation, and output at least one of the reference section or the reference number of times, and store the outputted reference section or the reference number of times in the memory.

The control circuit may be configured to: acquire whether the detection signal detected from the inductor is received through the first terminal, and based on the detection signal being not received, acquire whether the capacitor is abnormal by using at least one of the reference section or the reference number of times stored in the memory.

The abnormality of the capacitor may indicate an open of the capacitor.

In order to achieve the above and other objects, according to another aspect of embodiments, a method for operating a power supply device may include rectifying an AC voltage passing through an EMI filter by a rectifier; outputting a DC voltage by compensating power factor of the rectified voltage by a power factor compensation unit; and controlling the power factor compensation unit by a control circuit, wherein the power factor compensation unit may include: a capacitor connected to an output terminal of the rectifier; an inductor connected in parallel with the capacitor; and a switch connected in parallel with the inductor; wherein controlling the power factor compensation unit may include: obtaining whether the capacitor is abnormal based on a detection signal detected from the inductor, and controlling switching of the switch differently depending on whether the capacitor is abnormal.

The controlling the power factor compensation unit may include: receiving a detection signal detected from the inductor through a first terminal of the control circuit; and outputting a first switching control signal or a second switching control signal generated based on the detection signal to the switch through a second terminal of the control circuit.

The controlling the power factor compensation unit may include: controlling switching of the switch according to the first switching control signal to charge and discharge energy to the inductor when the capacitor is normal.

The controlling the power factor compensation unit may include: stopping the operation of the switch according to the second switching control signal based on there being a problem with the capacitor.

The controlling the power factor compensation unit may include: acquiring whether the detection signal detected from the inductor is received through the first terminal, and based on the detection signal being not received, and based on the section in which the detection signal is not received being longer than a preset reference section, determining that there is a problem with the capacitor.

The controlling the power factor compensation unit may include: acquiring whether the detection signal detected from the inductor is received through the first terminal, and based on the number of times the detection signal is not received being a preset reference number or greater, determining that there is a problem with the capacitor.

The controlling the power factor compensation unit may include: monitoring a surrounding power situation, learning the reference setting learning model by inputting a preset reference section, a preset reference number of times, and the monitored surrounding power situation, and outputting at least one of the reference section or the reference number of times, and storing the outputted reference section or the reference number of times in the memory.

The controlling the power factor compensation unit may include: acquiring whether the detection signal detected from the inductor is received through the first terminal, and based on the detection signal being not received, acquiring whether the capacitor is abnormal by using at least one of the reference section or the reference number of times stored in the memory.

In order to achieve the above and other objects, according to still another aspect of embodiments, a display device may include a power supply device; and a display configured to display an image using power of the power supply device, wherein the power supply device may include: an EMI filter; a rectifier configured to rectify an AC voltage passing through the EMI filter; a power factor compensation unit configured to compensate power factor of the rectified voltage and output a DC voltage; and a control circuit configured to control the power factor compensation unit; wherein the power factor compensation unit may include: a capacitor connected to an output terminal of the rectifier; an inductor connected in parallel with the capacitor; and a switch connected in parallel with the inductor; wherein the control circuit may be configured to: obtain whether the capacitor is abnormal based on a detection signal detected from the inductor, and control switching of the switch differently depending on whether the capacitor is abnormal.

Effect of the Invention

The embodiment can control the switching of a switch differently depending on whether a first capacitor is abnormal.

For example, in the case that the first capacitor is normal, the switch can be periodically turned on/off so that the power factor-compensated DC voltage can be charged to a second capacitor.

For example, in the case that the first capacitor is abnormal, the switch can be continuously turned off. Accordingly, an EMI filter can be prevented from heating due to resonance between the driving frequency of the switch and the cutoff frequency of the EMI filter, thereby improving product reliability. The first capacitor can be opened due to external factors such as cracks caused by external impact or component failure such as capacity reduction caused by internal foreign substances.

The switch can be controlled by switching based on a detection signal of a sensor that detects current flowing in an inductor.

In the embodiment, the presence or absence of an abnormality in the first capacitor can be determined using this detection signal. For example, in the case that the detection signal is not detected (or received) for a predetermined section or the section continues for a certain number of times, it can be determined that the first capacitor is abnormal.

Therefore, since the detection signal used for the switching control of the switch is also used to determine whether the first capacitor is abnormal, there is no need to have a separate sensor, so the circuit structure can be simplified and the cost can be reduced.

Meanwhile, in the embodiment, the section where the detection signal is not detected, the number of repetitions of the section, and the surrounding power situation are all considered, and the optimal reference section or reference number can be obtained by learning these pieces of information using a reference setting learning model. Accordingly, by considering the surrounding power situation, the misjudgment of the abnormality of the first capacitor can be prevented, and the presence or absence of the abnormality of the first capacitor can be more accurately determined using the optimal reference section or reference number, thereby improving product reliability.

BEST MODE

Hereinafter, the embodiments will be described in more detail with reference to the drawings.

The suffixes "module" and "part" used in the following description for components are given simply for the convenience of writing this specification, and do not themselves have any particularly important meaning or role. Therefore, the "module" and "part" may be used interchangeably.

Figure 1:
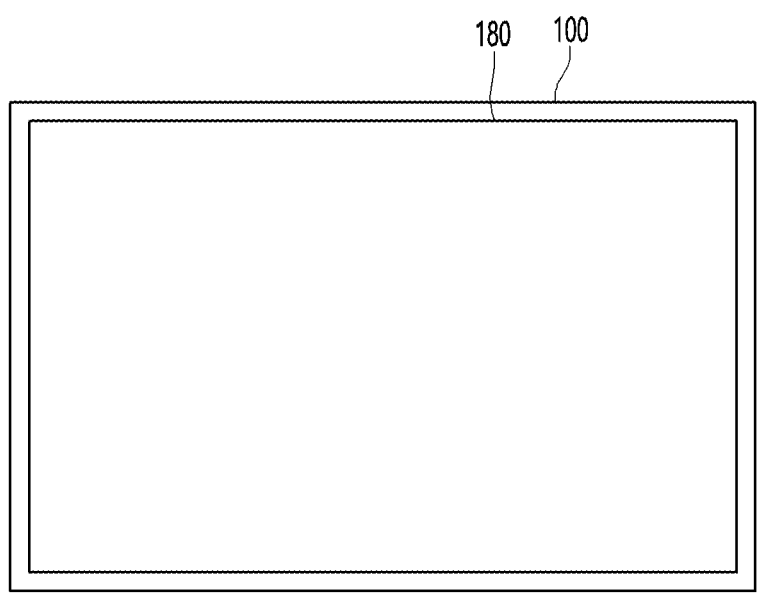
FIG. 1 is a diagram illustrating a display device according to an embodiment.

FIG. 1 is a diagram illustrating a display device according to an embodiment.

Referring to the diagram, a display device 100 may include a display 180.

Meanwhile, the display 180 may be implemented as any one of various panels. For example, the display 180 may be any one of a liquid crystal display panel (LCD panel), an organic light-emitting panel (OLED panel), an inorganic light-emitting panel (LED panel), and the like In the embodiment, the display 180 may be an organic light-emitting panel OLED panel, but is not limited thereto.

Figure 2:
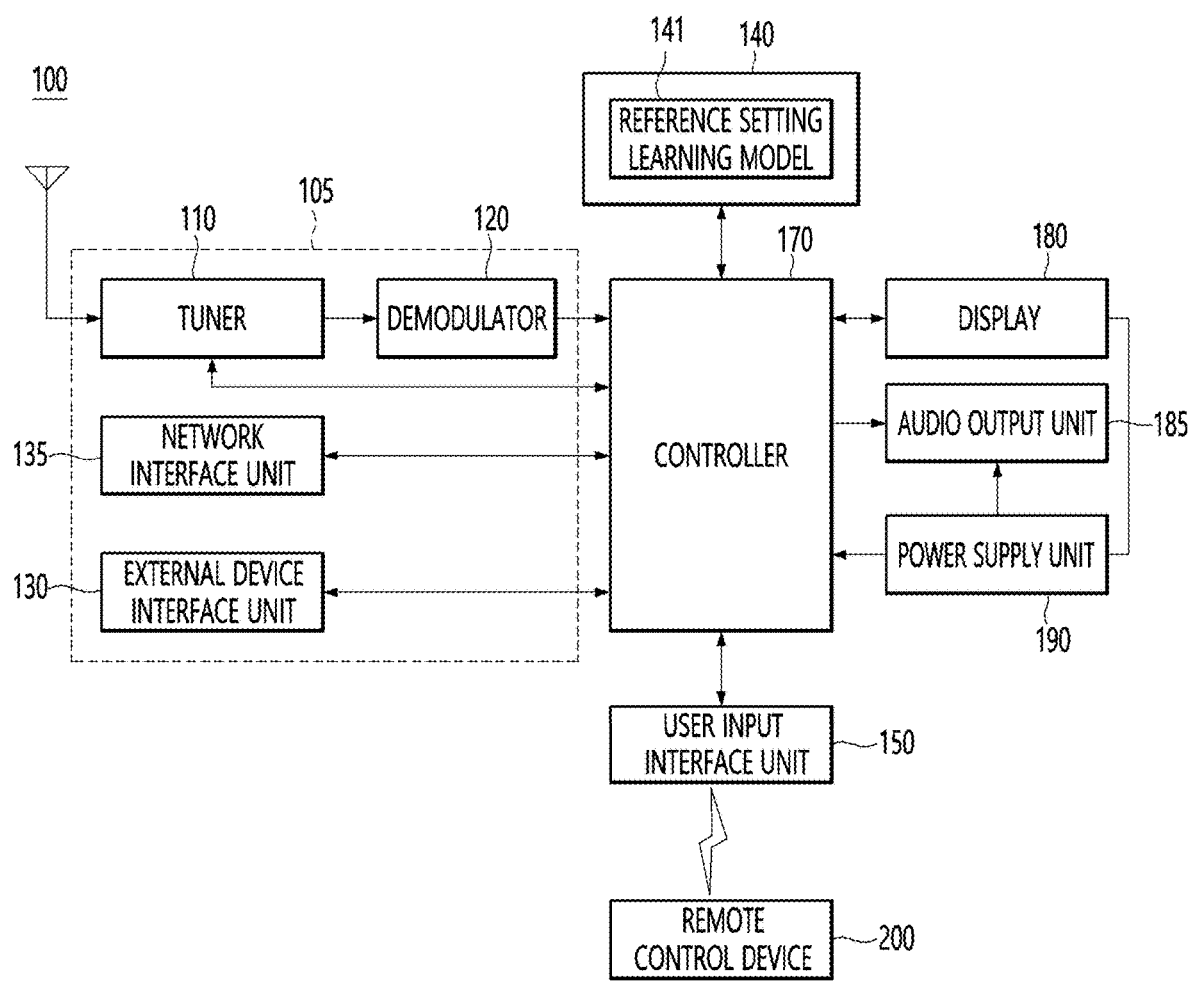
FIG. 2 is an example of an internal block diagram of the display device of FIG. 1.

Meanwhile, the display device 100 of FIG. 1 may be a monitor, a TV, a tablet PC, a mobile terminal, and the like FIG. 2 is an example of an internal block diagram of the display device of FIG. 1.

Referring to FIG. 2, the display device 100 according to the embodiment may include a broadcast receiving unit 105, an external device interface unit 130, a memory 140, a user input interface unit 150, a sensor unit (not shown), a controller 170, the display 180, an audio output unit 185, and a power supply unit 190.

The broadcast receiving unit 105 may include a tuner 110, a demodulator 120, a network interface unit 135, and an external device interface unit 130.

Meanwhile, the broadcast receiving unit 105 may include only the tuner 110, the demodulator 120, and the external device interface unit 130, unlike the diagram. In other words, the network interface unit 135 may not be included.

The tuner 110 selects an RF broadcast signal corresponding to a channel selected by a user or all pre-stored channels among RF Radio Frequency broadcast signals received through an antenna (not shown). In addition, the tuner 110 converts the selected RF broadcast signal into an intermediate frequency signal or a baseband image or audio signal.

For example, if the selected RF broadcast signal is a digital broadcast signal, the signal is converted into a digital IF signal (DIF), and if the signal is an analog broadcast signal, the signal is converted into an analog baseband image or audio signal (CVBS/SIF). In other words, the tuner 110 may process a digital broadcast signal or an analog broadcast signal. The analog baseband video or audio signal (CVBS/SIF) output from the tuner 110 may be directly input to the controller 170.

Meanwhile, the tuner 110 may be provided with multiple tuners in order to receive broadcast signals of multiple channels. Alternatively, a single tuner that simultaneously receives broadcast signals of multiple channels is also possible.

The demodulator 120 receives the digital IF signal (DIF) converted by the tuner 110 and performs a demodulation operation.

The demodulator 120 may output a stream signal (TS) after performing demodulation and channel decoding. At this time, the stream signal may be a signal in which a video signal, an audio signal, or a data signal is multiplexed.

The stream signal output from the demodulator 120 may be input to the controller 170. The controller 170 outputs the image to the display 180 and outputs the audio to the audio output unit 185 after performing demultiplexing, image/audio signal processing, and the like.

The external device interface unit 130 may transmit or receive data with a connected external device (not shown), for example, a set-top box. To this end, the external device interface unit 130 may include an A/V input/output unit (not shown).

The external device interface unit 130 may be connected to an external device such as a DVD Digital Versatile Disk, Blu-ray, game device, camera, camcorder, computer laptop, set-top box, and the like, in wired/wireless manner, and may also perform input/output operations with the external device.

The A/V input/output unit may receive image and audio signals of an external device. Meanwhile, the wireless communication unit (not shown) may perform short-range wireless communication with other electronic devices.

Through this wireless communication unit (not shown), the external device interface unit 130 may exchange data with an adjacent mobile terminal (not shown). In particular, the external device interface unit 130 may receive device information, running application information, application images, and the like from the mobile terminal (not shown) in mirroring mode.

The network interface unit 135 provides an interface for connecting the display device 100 to a wired/wireless network including the Internet. For example, the network interface unit 135 may receive content or data provided by the Internet or a content provider or a network operator through a network.

Meanwhile, the network interface unit 135 may include the wireless communication unit (not shown).

The memory 140 may store programs for each signal processing and control in the controller 170, and may store processed video, audio or data signals.

In addition, the memory 140 may perform a function for temporary storage of video, audio or data signals input to the external device interface unit 130. In addition, the memory 140 may store information on a specific broadcast channel through a channel memory function such as a channel map.

Although the memory 140 of FIG. 2 is provided separately from the controller 170, the scope of the embodiment is not limited thereto. The memory 140 may be included in the controller 170.

The user input interface unit 150 transmits a signal input by a user to the controller 170, or transmits a signal from the controller 170 to the user.

For example, the user input signal input from a local key (not shown) such as a power key, a channel key, a volume key, or a setting value may be transmitted to the controller 170, or a user input signal input from a sensor unit (not shown) that senses the user's gesture may be transmitted to the controller 170, or a signal from the controller 170 may be transmitted to the sensor unit (not shown).

The controller 170 may demultiplex an input stream or process demultiplexed signals through the tuner 110 or the demodulator 120 or the network interface unit 135 or the external device interface unit 130 to generate and output a signal for image or audio output.

The image signal processed by the controller 170 may be input to the display 180 and displayed as an image corresponding to the image signal. In addition, the image signal processed by the controller 170 may be input to an external output device through the external device interface unit 130.

The audio signal processed by the controller 170 may be output as sound to the audio output unit 185. In addition, the audio signal processed by the controller 170 may be input to an external output device through the external device interface unit 130.

Although not shown in FIG. 2, the controller 170 may include a demultiplexer, an image processing unit, and the like. This will be described later with reference to FIG. 3.

In addition, the controller 170 may control the overall operation within the display device 100. For example, the controller 170 may control the tuner 110 to select a channel selected by the user or an RF broadcast corresponding to a pre-stored channel.

In addition, the controller 170 may control the display device 100 by a user command or an internal program input through the user input interface unit 150.

Meanwhile, the controller 170 may control the display 180 to display an image. At this time, the image displayed on the display 180 may be a still image or a moving image, and may be a 2D image or a 3D image.

Meanwhile, the controller 170 may control the display 180 such that a predetermined object to be displayed within an image displayed on the display 180. For example, the object may be at least one of a connected web screen (newspaper, magazine, etc.), an EPG (Electronic Program Guide), various menus, widgets, icons, still images, videos, or texts.

Meanwhile, the controller 170 may recognize the user's location based on an image captured from a shooting unit (not shown). For example, the distance (z-axis coordinate) between the user and the display device 100 may be determined. In addition, the x-axis coordinate and the y-axis coordinate within the display 180 corresponding to the user's location may be determined.

The display 180 converts an image signal, data signal, OSD signal, control signal, or an image signal, data signal, control signal, and the like processed by the controller 170 or received from an external device interface unit 130 to generate a driving signal.

Meanwhile, the display 180 is configured as a touch screen and may be used as an input device in addition to an output device.

The audio output unit 185 receives a signal processed by the controller 170 and outputs the signal as a voice.

The shooting unit (not shown) takes a picture of the user. The shooting unit (not shown) may be implemented with one camera, but is not limited thereto, and may also be implemented with multiple cameras. Image information captured by the shooting unit (not shown) may be input to the controller 170.

The controller 170 may detect the user's gesture based on the image captured by the shooting unit (not shown) or the signal detected from the sensor unit (not shown), or a combination thereof.

The power supply unit 190 supplies the corresponding power to the entire display device 100. In particular, the power supply unit 190 may supply power to the controller 170 that may be implemented in the form of a System-On-Chip (SOC), the display 180 for displaying images, and the audio output unit 185 for audio output.

Specifically, the power supply unit 190 may be provided with a converter that converts AC power into DC power and a dc/dc converter that converts the level of the DC power.

A remote control unit 200 transmits the user input to the user input interface unit 150. To this end, the remote control unit 200 may use Bluetooth, RF Radio Frequency communication, IR Infrared communication, UWB (Ultra Wideband), ZigBee, and the like In addition, the remote control device 200 may receive images, voices, or data signals output from the user input interface unit 150 and display or output them as voices on the remote control device 200.

Meanwhile, the above-described display device 100 may be a fixed or mobile digital broadcast receiver capable of receiving digital broadcasts.

Meanwhile, the block diagram of the display device 100 illustrated in FIG. 2 is a block diagram for an embodiment. Each component of the block diagram may be integrated, added, or omitted according to the specifications of the display device 100 actually implemented. That is, two or more components may be combined into one component, or one component may be subdivided into two or more components, as needed. In addition, the functions performed by each block are for describing the embodiment, and the specific operations or devices thereof do not limit the scope of the embodiment.

Meanwhile, the unexplained reference numeral 141 in FIG. 2 is a reference setting learning model, which may be stored in the memory 140. The reference setting learning model 141 may learn a preset reference section, a preset reference number, and a surrounding power situation, and output at least one of the reference section or the reference number. Here, the reference section or the reference number output from the reference setting learning model 141 may be an optimal judgment criterion output by continuous learning of the reference setting learning model 141 as a criterion for determining whether the first capacitor 331 of the power factor compensation unit (330 of FIG. 3 and FIG. 4) is abnormal. The reference setting learning model 141 will be described in detail later.

Figure 3:
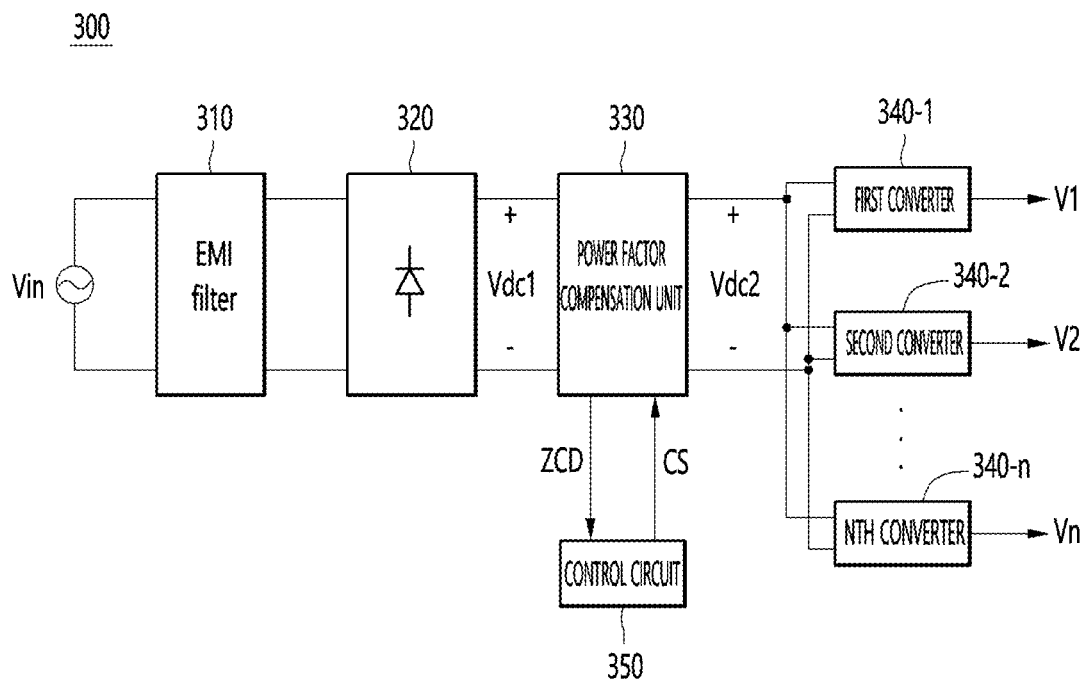
FIG. 3 is a block diagram illustrating a power supply device according to an embodiment.
Figure 4:
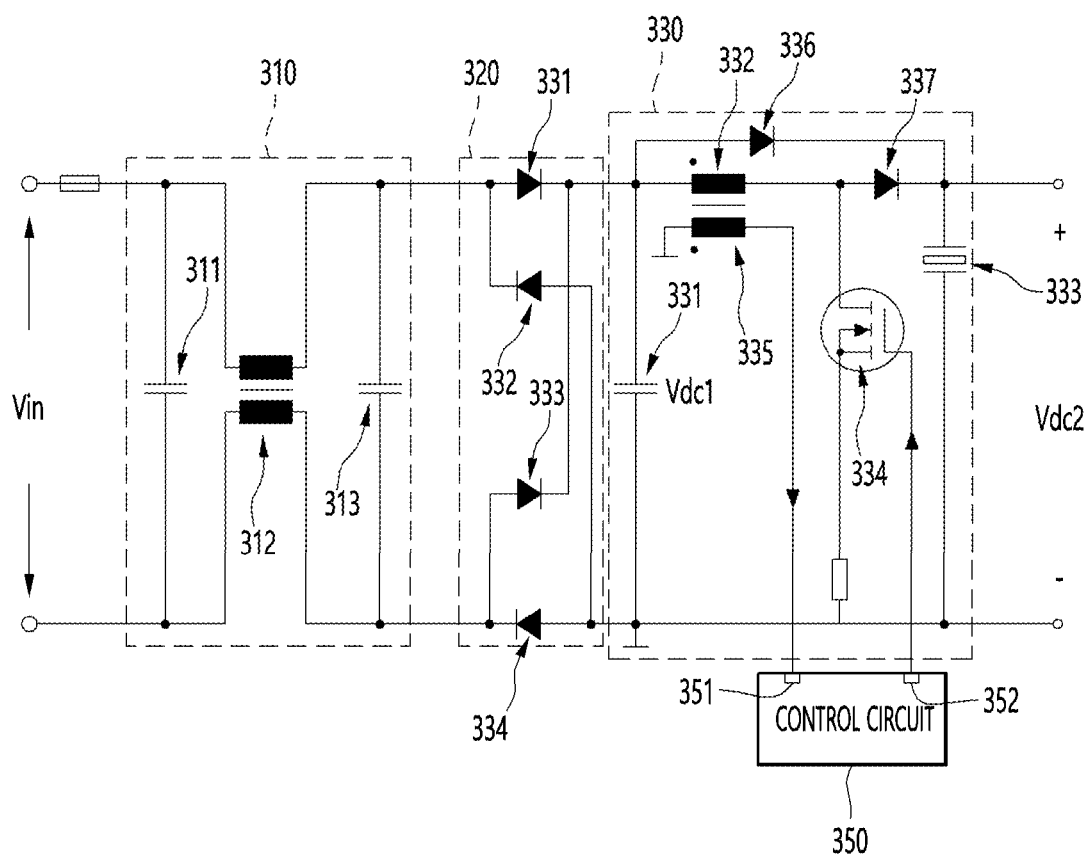
FIG. 4 is a circuit diagram illustrating a power supply device according to an embodiment.

FIG. 3 is a block diagram illustrating a power supply device according to an embodiment. FIG. 4 is a circuit diagram illustrating a power supply device according to an embodiment.

Referring to FIGS. 3 and 4, a power supply device 300 according to an embodiment may include an EMI filter 310, a rectifier 320, a power factor correction device 330, and a control circuit 350.

The power supply device 300 according to the embodiment may be the power supply device 190 illustrated in FIG. 2, but is not limited thereto.

Although the control circuit 350 is illustrated as being included in the power supply device 300 in the diagram, it may be included in the controller 170 illustrated in FIG. 2.

The EMI filter 310 may remove noise generated at an input side of the rectifier 320, thereby preventing noise from being included in the input voltage Vin input to the rectifier 320. The input voltage Vin is an AC voltage (Vin) and may be a voltage supplied from an external substation to the home. Hereinafter, the input voltage Vin and the AC voltage Vin may be used interchangeably.

For example, the EMI filter 310 may include an inductor 312 and capacitors 311 and 313 installed in front and behind the inductor 312, but is not limited thereto. The EMI filter 310 may be designed to remove noise frequencies higher than a specific frequency, that is, a cut-off frequency. Since the noise frequencies corresponding to the cut-off frequency or higher are removed by the EMI filter 310 installed in front of the rectifier 320, a noise-free AC voltage Vin may be input to the rectifier 320.

The rectifier 320 may rectify the AC voltage Vin that has passed through the EMI filter 310 and output a first DC voltage Vdc1. For example, the rectifier 320 may include four diodes 321 to 324, but is not limited thereto.

The power factor compensation unit 330 may compensate power factor of the first DC voltage Vdc1 and output a second DC voltage Vdc2.

The power factor compensation unit 330 may adjust the phase of the current on the load side so that the difference between the phase of the input voltage Vin input from the outside, that is, the AC voltage Vin, and the phase of the current on the load side is reduced or matched.

For this purpose, the power factor compensation unit 330 may include a first capacitor 331, an inductor 332, a second capacitor 333, and a switch 334. The switch 334 may be, for example, a semiconductor switch, such as a FET switch, but is not limited thereto.

The first capacitor 331 is a component in which the first DC voltage Vdc1 of the rectifier 320 is charged, and is depicted as being included in the power factor compensation unit 330 in the diagram, but may also be included in the rectifier 320, that is, may be installed at the output terminals of the four diodes 321 to 324 of the rectifier 320 and may play a role in smoothing the voltage rectified by the four diodes 321 to 324.

Figure 5:
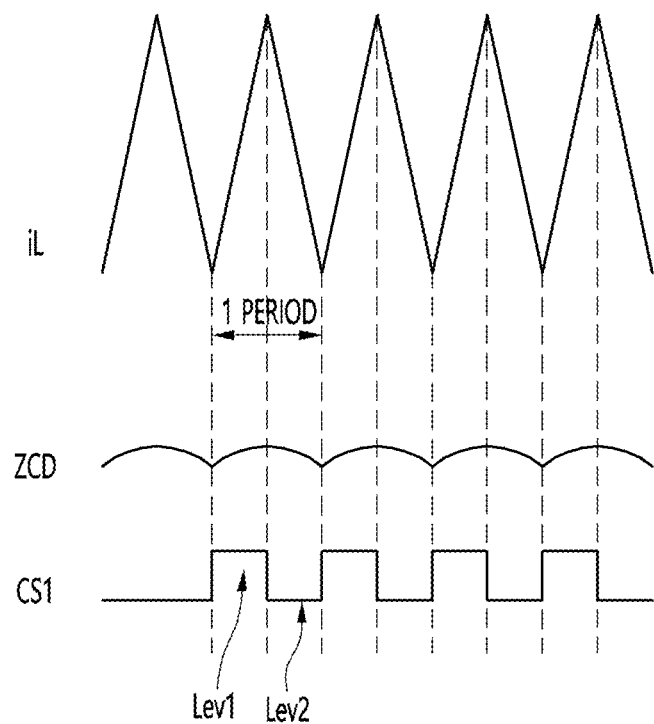
FIG. 5 illustrates a waveform diagram when the power factor compensation unit is operating normally.

The inductor 332 is connected in parallel with the first capacitor 331 and may be charged and discharged by the switching control of the switch 334. For example, when the switch 334 is turned on, energy is charged in the inductor 332, and accordingly, the current iL flowing in the inductor 332 may increase as illustrated in FIG. 5. Here, the energy may be, for example, the output voltage of the rectifier 320, that is, the first DC voltage Vdc1, but is not limited thereto. For example, when the switch 334 is turned off, the energy charged in the inductor 332 may be charged in the second capacitor 333 together with the first DC voltage Vdc1 charged in the first capacitor 331. Accordingly, the inductor 332 is discharged, and the current iL flowing in the inductor 332 may decrease. In this way, the inductor 332 is charged and discharged by the switch 334 that is periodically switched, and accordingly, the current iL flowing in the inductor 332 may increase or decrease.

In FIG. 5, the current iL of the inductor 332 is shown to increase or decrease linearly, but it may also increase or decrease nonlinearly.

The switch 334 and the second capacitor 333 may be connected in parallel with the inductor 332. As described above, energy may be charged and discharged in the inductor 332 by the switching control of the switch 334.

Figure 6:
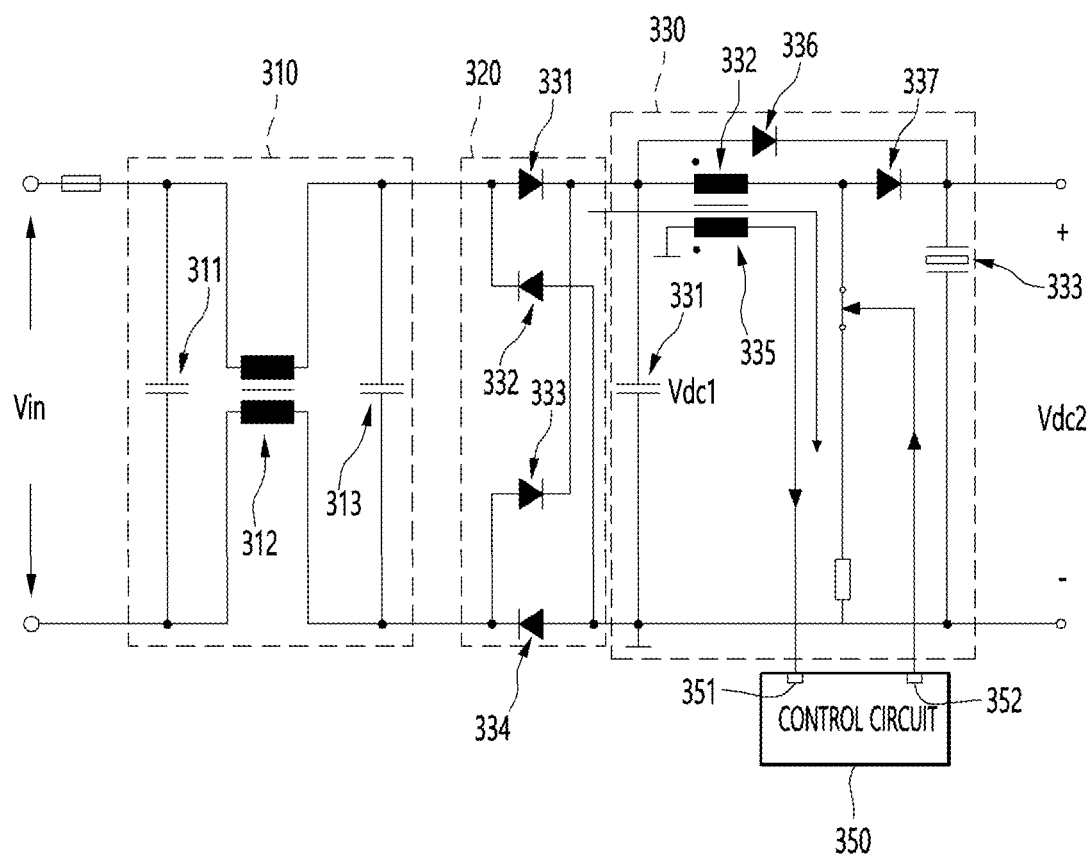
FIG. 6 illustrates that the switch is turned on and the power factor compensation unit is charged with the first DC voltage and energy.

For example, as shown in FIG. 6, when the switch 334 is turned on, the current iL of the inductor 332 may flow through the switch 334. Accordingly, since the inductor 332 is charged with energy, the current iL flowing in the inductor 332 may increase, as shown in FIG. 5.

Figure 7:
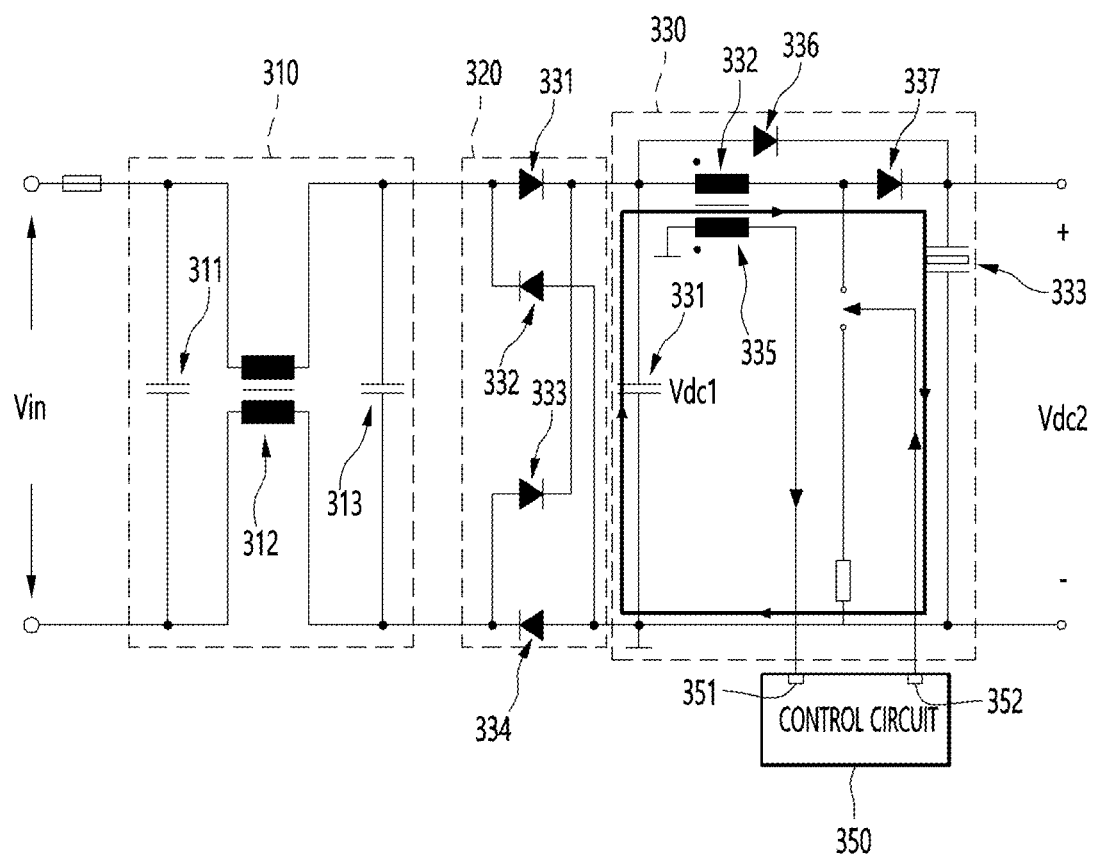
FIG. 7 illustrates that the switch is turned off and the power factor compensation unit generates the second DC voltage.

When the current iL flowing in the inductor 332 exceeds a second threshold, as shown in FIG. 7, the switch 334 is turned off, so that a current path for the current iL may be formed in the order of the first capacitor 331, the inductor 332, and the second capacitor 333. Accordingly, as shown in FIG. 5, the current iL flowing in the inductor 332 may be reduced.

When the current iL flowing in the inductor 332 again reaches a first threshold, as shown in FIG. 6, the switch 334 is turned on, so that energy is charged in the inductor 332, so that the current iL flowing in the inductor 332 may increase. Here, the first threshold may be 0, but is not limited thereto. Therefore, when the current iL flowing in the inductor 332 becomes 0, the switch 334 may be turned on, and when the current iL flowing in the inductor 332 increases and exceeds the second threshold, the switch 334 may be turned off.

Therefore, the switch 334 may be turned on/off periodically by the first threshold and the second threshold, so that energy may be periodically charged and discharged in the inductor 332. Conversely, since energy is periodically charged and discharged in the inductor 332, the switch 334 may be turned on/off periodically by the first threshold and the second threshold.

Meanwhile, the power factor compensation unit 330 may include a sensor 335 for detecting the current iL flowing in the inductor 332 to be used as a judgment criterion for the switching control of the switch 334.

The sensor 335 may be a wound coil installed around the inductor 332, but is not limited thereto. When the current iL flows in the inductor 332, the current is induced in the sensor 335 by the current iL, and a predetermined signal may be detected. Here, the signal may be a voltage or a current. The detected signal may be transmitted through a first terminal 351 of the control circuit 350.

As another example, two or more resistors for voltage distribution are installed along with the coil wound on the sensor 335, so that the signal detected from the coil is converted into a voltage signal, and the voltage signal may be transmitted through the first terminal 351 of the control circuit 350.

In an embodiment, the detected signal may be called a detection signal ZCD.

Meanwhile, the control circuit 350 may generate a switching control signal CS for switching control of the switch 334 based on the detection signal received by the first terminal 351. The switching control signal CS may be output to the switch 334 through a second terminal 352.

According to an embodiment, the switching control signal CS may include a first switching control signal CS1 and a second switching control signal CS2.

The first switching control signal CS1 and the second switching control signal CS2 may be generated depending on whether the first capacitor 331 is abnormal. For example, in the case that the first capacitor 331 is normal, the first switching control signal CS1 may be generated, and in the case that the first capacitor 331 is abnormal, the second switching control signal CS2 may be generated.

As described above, the first capacitor 331 may be included in the power factor compensation unit 330 as shown in FIG. 4, or may be included in the rectifier unit 320 although not shown, and may be a component for charging the first DC voltage Vdc1 of the rectifier unit 320.

Figure 8:
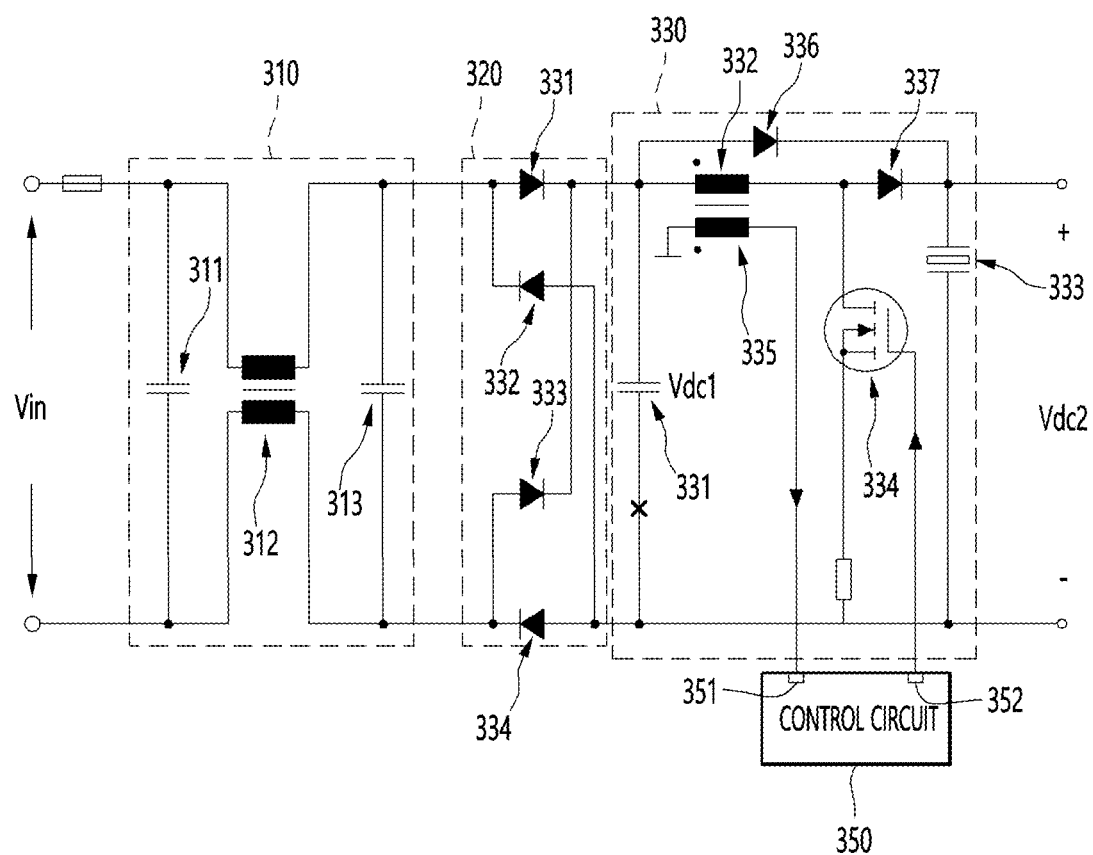
FIG. 8 illustrates that there is a problem with the first capacitor of the power factor compensation unit.

Typically, the first capacitor 331 is an electronic component and may be installed on a PCB substrate or board using soldering, and the like. The first capacitor 331 may be opened due to external factors such as cracks caused by external impact or component failure such as capacity reduction caused by internal foreign substances. Here, open X may mean that the first capacitor 331 and the power line are electrically disconnected, as shown in FIG. 8. Accordingly, the current of the power line may not flow to the first capacitor 331, and the voltage of the power line may not be charged to the first capacitor 331.

Figure 18:
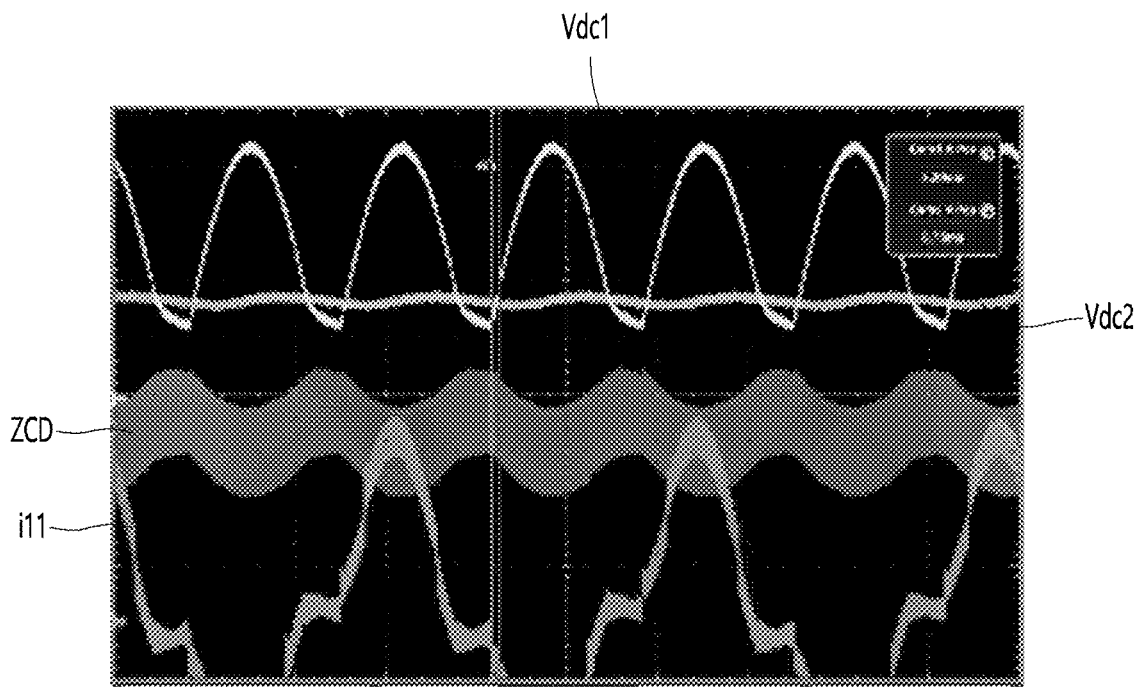
FIG. 18 illustrates waveforms of the input AC current, the first DC voltage, and the detection signal, respectively, when the power factor compensation unit is operating normally.

As shown in FIG. 18, in the case that the first capacitor 331 is operated normally because the open does not occur in the first capacitor 331, the input current i11, the first DC voltage Vdc1, the second DC voltage Vdc2, and the detection signal ZCD may be generated normally.

Figure 19A:
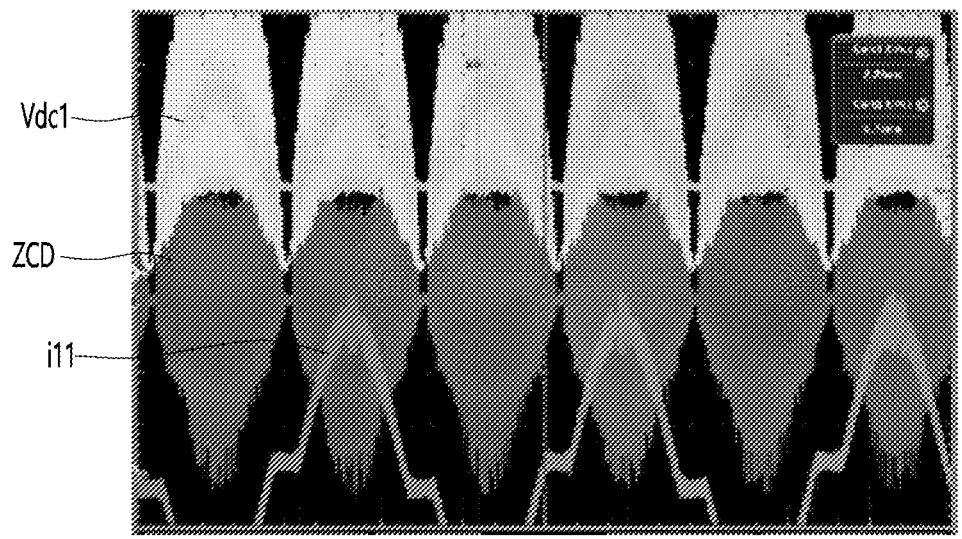
FIG. 19A illustrates waveforms of the input AC current, the first DC voltage, and the detection signal, respectively, at the first point in time when there is a problem with the first capacitor.
Figure 19B:
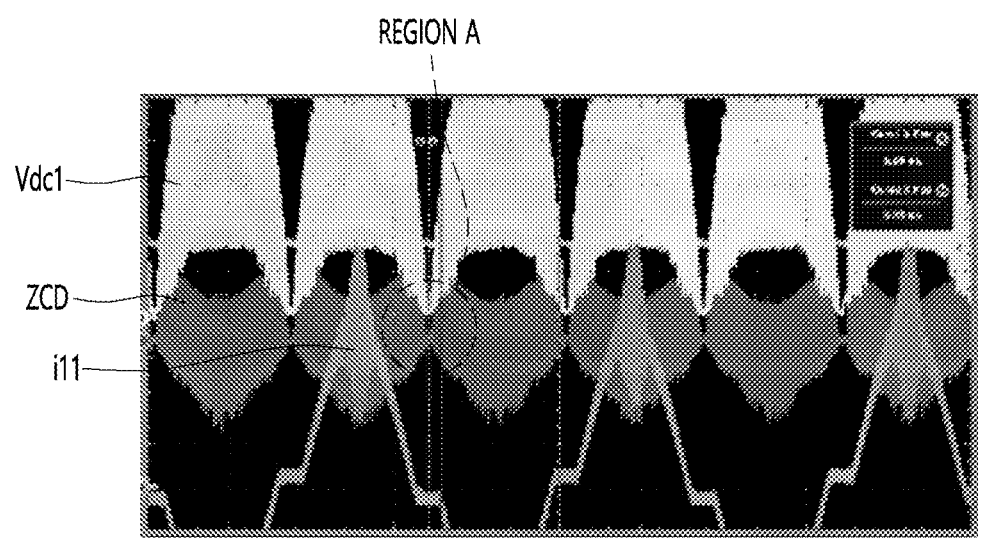
FIG. 19B illustrates waveforms of the input AC current, the first DC voltage, and the detection signal, respectively, at the second point in time when there is a problem with the first capacitor.

However, as shown in FIGS. 19A and 19B, in the case that an open circuit occurs in the first capacitor 331 and there is an abnormality in the first capacitor 331, it may be seen that the peak of the input current i11 increases rapidly and the first DC voltage Vdc1 and the detection signal are also abnormally generated. FIG. 19B shows a waveform at the second point in time, and it may be seen that the peak of the input current i11 increases even more rapidly compared to the waveform at the first point in time of FIG. 19A. Here, the second point in time represents a longer time elapsed than the first point in time, for example, the first point in time may be 10 minutes and the second point in time may be 20 minutes, but this is not limited thereto.

In the case that the peak of the input current i11 increases rapidly, the EMI filter 310 may be heated and the temperature may rise.

In particular, when there is a problem with the first capacitor 331, the AC voltage Vin passing through the EMI filter 310 is changed, and the driving frequency for controlling the switch 334 may also be changed by the change in the AC voltage Vin. Normally, the driving frequency of the switch 334 is higher than the cut-off frequency of the EMI filter 310, but the driving frequency of the switch 334 may be lowered by the change in the AC voltage Vin. In the case that the driving frequency of the switch 334 is lowered and becomes the same as the cutoff frequency of the EMI filter 310, the cut-off frequency of the EMI filter 310 may resonate due to the driving frequency of the switch 334, and thus the heat generation of the EMI filter 310 may be promoted and accelerated. In this case, the temperature of the EMI filter 310 rises to 100° C. or more, so that the EMI filter 310 itself burns or the PCB substrate or board on which the EMI filter 310 is mounted burns, which causes a problem in that product reliability is significantly reduced.

The embodiment may prevent damage to the EMI filter 310 even in the case that there is a problem with the first capacitor 331 by controlling the switching of the switch 334 differently depending on whether there is a problem with the first capacitor 331, thereby improving product reliability.

To this end, the control circuit 350 may generate the first switching control signal CS1 or the second switching control signal CS2 depending on whether there is a problem with the first capacitor 331.

The first switching control signal CS1 or the second switching control signal CS2 may be generated based on the detection signal ZCD detected from the inductor 332 of the power factor compensation unit 330.

For example, when the first capacitor 331 is normal, as shown in FIG. 5, the detection signal may be detected normally and received through the first terminal 351 of the control circuit 350. The control circuit 350 may generate the first switching control signal CS1 based on the detected detection signal and output the first switching control signal CS1 to the switch 334 through the second terminal 352.

The first switching control signal CS1 may include a control signal that periodically has a first level Lev1 and a second level Lev2. The first level Lev1 and the second level Lev2 have different values, and the first level Lev1 may be a high level and the second level Lev2 may be a low level that is lower than the first level Lev1, but this is not limited. For example, the switch 334 may be turned on by the first level Lev1 and turned off by the second level Lev2.

The first level Lev1 may have a first section from when the current iL flowing in the inductor 332 is at its lowest point until the current iL flowing in the inductor 332 is at its highest point, and the second level Lev2 may have a second section from when the current iL flowing in the inductor 332 is at its highest point until the current iL flowing in the inductor 332 is at its lowest point. That is, the first switching control signal CS1 having the first level Lev1 during the first section of one cycle and the second level Lev2 during the second section of one cycle may be generated.

As shown in FIG. 6, when the switch 334 is turned on by the first level Lev1 of the first switching control signal CS1, the current iL flowing in the inductor 332 may increase as energy is charged in the inductor 332.

As the current iL flowing in the inductor 332 increases, the detection signal detected by the sensor 335 may also increase.

When the detection signal exceeds the second threshold, that is, when the current iL flowing in the inductor 332 reaches a peak point, the control circuit 350 may output the first switching control signal CS1 having the second level Lev2 to the switch 334 through the second terminal 352. As illustrated in FIG. 7, when the switch 334 is turned off by the first switching control signal CS1 having the second level Lev2, the energy charged in the inductor 332 may be charged to the second capacitor 333 as the second DC voltage Vdc2 together with the first DC voltage Vdc1 of the first capacitor 331. The second DC voltage Vdc2 may be greater than the first DC voltage Vdc1. For example, the first DC voltage Vdc1 may be 330 V and the second DC voltage Vdc2 may be 400 V, but this is not limited thereto.

As the energy charged in the inductor 332 is charged to the second capacitor 333, the inductor 332 is discharged, so the current iL flowing in the inductor 332 may decrease. As the current iL flowing in the inductor 332 decreases, the detection signal for the current iL flowing in the inductor 332 may also decrease.

When the detection signal decreases and becomes 0, the control circuit 350 may generate a first switching control signal CS1 having the first level Lev1 again and output it to the switch 334 through the second terminal 352. Accordingly, as shown in FIG. 6, when the switch 334 is turned on, energy may be charged in the inductor 332.

Therefore, when the first capacitor 331 is normal, the control circuit 350 may generate the first switching control signal CS1 having the first level Lev1 and the second level Lev2.

Meanwhile, when there is an abnormality in the first capacitor 331, the control circuit 350 may generate the second switching control signal CS2 having a constant level Lev3.

In the case that there is a problem with the first capacitor 331, that is, in the case that an open circuit occurs in the first capacitor 331, as shown in FIGS. 19A and 19B, the input current i11, the first DC voltage Vdc1, and the detection signal are also different from the waveform FIG. 18 when the first capacitor 331 is normal.

Figure 20:
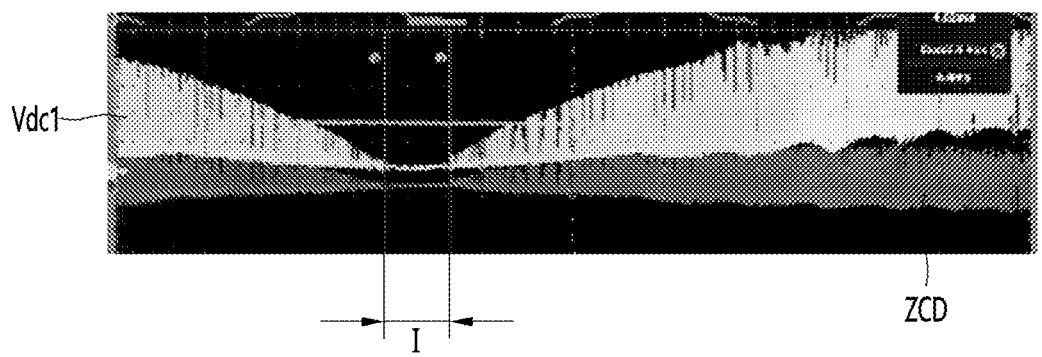
FIG. 20 is an enlarged diagram of region A of FIG. 19B.

For example, the peak of the input current i11 may increase rapidly. In particular, as shown in FIG. 20, a section I in which the detection signal is not detected may occur periodically.

Figure 9:
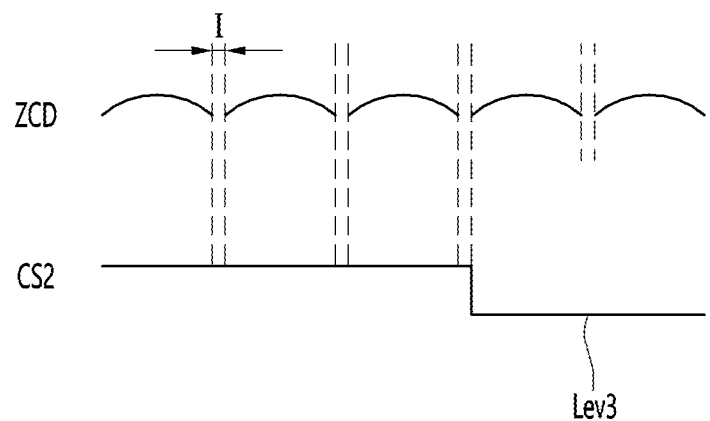
FIG. 9 illustrates a waveform diagram when there is a problem with the first capacitor of the power factor compensation unit.

As shown in FIG. 9, the section I in which the detection signal does not exist may occur periodically. In the case that there is a problem with the first capacitor 331, the detection signal detected in the inductor 332 may be received by the control circuit 350 through the first terminal 351.

The section I where the detection signal does not exist may not be received through the first terminal 351. Therefore, the control circuit 350 may check whether the detection signal is not received through the first terminal 351 and, in the case that the detection signal is not received, how long the section is where the detection signal is not received.

The control circuit 350 may generate the second switching control signal CS2 having the constant level Lev3 based on the section I where the detection signal does not exist periodically in the detection signal received through the first terminal 351, and output the second switching control signal CS2 to the switch 334 through the second terminal 352. The constant level Lev3 may be a level that may turn off the switch 334. Therefore, the switch 334 may be continuously turned off by the constant level Lev3. That is, the operation of the switch 334 may be continuously stopped.

The control circuit 350 may determine whether there is a problem in the first capacitor 331 by considering the width of the section I where the detection signal does not exist or the number of occurrences of the corresponding section.

For example, the control circuit 350 may determine that there is a problem in the first capacitor 331 in the case that the width of the section I where the detection signal does not exist is greater than or equal to a preset reference section.

For example, the control circuit 350 may determine that there is a problem in the first capacitor 331 in the case that the number of occurrences of the section I where the detection signal does not exist is greater than or equal to a preset reference number.

As illustrated in FIG. 9, in the case that the number of occurrences of the section I where the detection signal does not exist is 3 times, the control circuit 350 may determine that there is a problem in the first capacitor 331 and generate the second switching control signal CS2 having the constant level Lev3.

In FIG. 9, the number of occurrences is shown as 3 times, but 2 or 4 or more times are also possible.

In the case that the control circuit 350 determines that there is an abnormality in the first capacitor 331, it may generate the second switching control signal CS2 having the constant level Lev3 and output the second switching control signal CS2 to the switch 334 through the second terminal 352. The switch 334 may be turned off by the constant level Lev3 of the second switching control signal CS2.

Since the switch 334 is not turned on/off periodically but is continuously turned off, there is no driving frequency of the switch 334. Accordingly, the driving frequency of the switch 334 no longer resonates with the cutoff frequency of the EMI filter 310, so that the heat generation of the EMI filter 310 is released and the temperature of the EMI filter 310 is lowered, so that a fire of the EMI itself or a fire of the PCB substrate or board may be prevented.

Since the unexplained reference numeral 336 may operate during the initial operation of the power supply device 300, it may be called a start-up bypass diode, but for the convenience of explanation, it will be collectively called a bypass diode 112.

For example, when an AC voltage Vin is supplied to the power factor compensation unit 330 without the bypass diode 336, a very large DC current may be charged to the second capacitor 333 through the inductor 332. In this case, an overvoltage may occur due to a large DC current, and the switch 334 may be destroyed or malfunction.

On the other hand, in the case that the bypass diode 336 is provided in the power factor compensation unit 330, when the power supply device 300 starts, the AC voltage Vin is charged to the second capacitor 333 via the bypass diode 336, so that an overvoltage does not occur in the power supply device 300, and thus the destruction or malfunction of the switch 334 may be prevented.

The unexplained reference numeral 337 is a reverse current prevention diode, and may prevent the reverse current caused by the second DC voltage Vdc2 charged in the second capacitor 333 from flowing to the inductor 332.

Meanwhile, as illustrated in FIG. 3, the power supply device 300 according to the embodiment may include a plurality of converters 340-1 to 340-$n$.

The plurality of converters 340-1 to 340-$n$ may convert the second DC voltage Vdc2 output from the power factor compensation unit 330 into different third voltages V1 to Vn. Here, the third voltages V1 to Vn may be DC voltages or AC voltages.

These third voltages V1 to Vn may be used to activate or operate various electronic components or driving devices.

Hereinafter, the operating method of the power supply device 300 according to the embodiment will be described with reference to FIGS. 10 to 17. The diagrams of FIGS. 3 to 9 may be referred to in the description of FIGS. 10 to 17.

Figure 10:
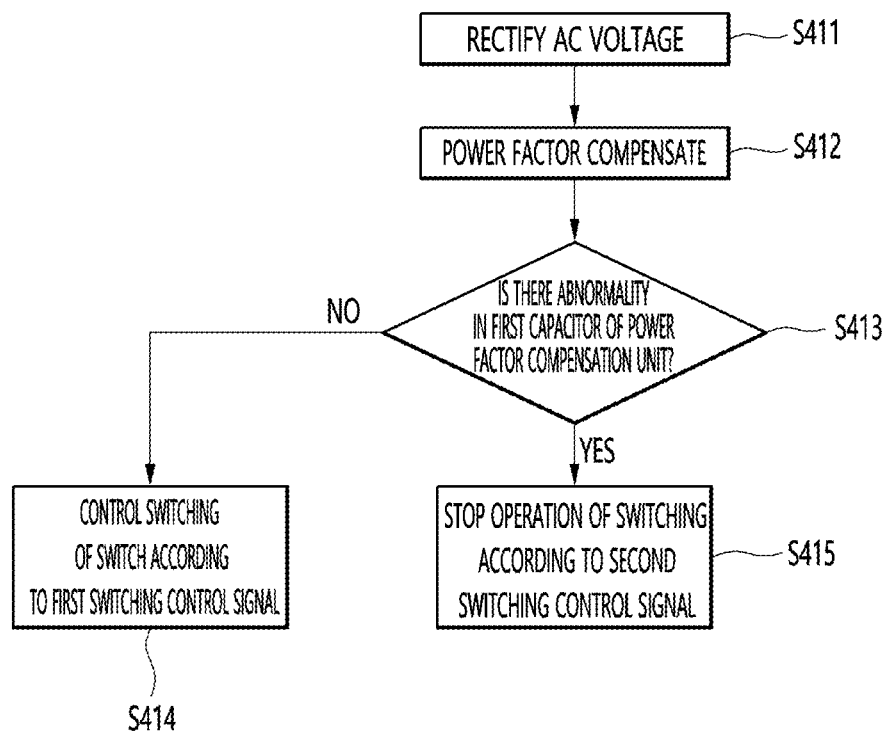
FIG. 10 is a flowchart for describing an operation method of a power supply device according to an embodiment.

FIG. 10 is a flowchart for describing an operation method of a power supply device according to an embodiment.

As shown in FIG. 10, the rectifier 320 may rectify an AC voltage Vin that has passed through an EMI filter 310 (step S411).

The EMI filter 310 may be installed in front of the rectifier 320 and may remove noise flowing into the rectifier 320. The voltage rectified by the rectifier 320 may be the first DC voltage Vdc1.

The power factor compensation unit 330 may power factor compensate the rectified voltage, that is, the first DC voltage Vdc1, and output the second DC voltage Vdc2 (step S412).

The power factor compensation unit 330 may include the first capacitor 331, the inductor 332, the second capacitor 333, and the switch 334, as illustrated in FIG. 4.

The first capacitor 331 may be connected to the output terminal of the rectifier 320, the inductor 332 may be connected in parallel with the first capacitor 331, and the second capacitor 333 and the switch 334 may be connected in parallel with the inductor 332.

The control circuit 350 may obtain whether there is an abnormality in the first capacitor 331 of the power factor compensation unit 330 (step S413).

The control circuit 350 may control the switching of the switch 334 differently depending on whether there is an abnormality in the first capacitor 331.

For example, when the first capacitor 331 is normal, the control circuit 350 may control the switching of the switch 334 according to the first switching control signal CS1 S414. As the switch 334 is periodically turned on/off according to the first switching control signal CS1, the inductor 332 is periodically charged/discharged, so that the second capacitor 333 may be charged with the second DC voltage Vdc2.

Specifically, the switch 334 may be periodically turned on/off according to the first switching control signal CS1 illustrated in FIG. 5. For example, the switch 334 may be turned on by the first level Lev1 of the first switching control signal CS1, and the switch 334 may be turned off by the second level Lev2 of the first switching control signal CS1.

When the switch 334 is turned on by the first level Lev1 of the first switching control signal CS1, energy is charged in the inductor 332, and accordingly, the current iL flowing in the inductor 332 may increase. As the current iL increases, the detection signal detected from the sensor 335 installed in the inductor 332 may also increase.

The control circuit 350 may receive the detection signal through the first terminal 351. The first threshold and the second threshold may be set in the control circuit 350. The second threshold may be greater than the first threshold.

The control circuit 350 may obtain whether the detection signal is greater than the second threshold, and in the case that the detection signal is greater than the second threshold, generate the first switching control signal CS1 having the second level Lev2, and output the first switching control signal CS1 to the switch 334 through the second terminal 352. The switch 334 may be turned off by the second level Lev2 of the first switching control signal CS1.

When the switch 334 is turned off, the energy charged in the inductor 332 may be charged as the second DC voltage Vdc2 to the second capacitor 333 together with the first DC voltage Vdc1 of the first capacitor 331. Accordingly, as the inductor 332 is discharged, the current iL flowing in the inductor 332 may be reduced. In this case, the detection signal detected in the inductor 332 may also be reduced.

The control circuit 350 obtains whether the decreasing detection signal matches the first threshold, and in the case that the detection signal matches the first threshold, generates the first switching control signal CS1 having the first level Lev1 and outputs the first switching control signal CS1 to the switch 334 through the second terminal 352. The switch 334 may be turned on by the first level Lev1 of the first switching control signal CS1.

In this way, by periodically turning on/off the switch 334 using the first threshold and the second threshold set in the control circuit 350, the inductor 332 is periodically charged and discharged, thereby charging the second capacitor 333 with the second DC voltage Vdc2 greater than the first DC voltage Vdc1, and at the same time, the phase of the current iL flowing in the inductor 332 may be adjusted to match the phase of the AC voltage Vin to minimize the reactive power and compensate for the power factor.

Meanwhile, when there is an abnormality in the first capacitor 331, the control circuit 350 may control the switching of the switch 334 according to the second switching control signal CS2 (step S415). As the switch 334 is continuously turned off according to the second switching control signal CS2, the driving frequency of the switch 334 no longer resonates with the cutoff frequency of the EMI filter 310, thereby preventing a fire of the EMI filter 310 or a fire of the PCB substrate or board, thereby improving product reliability.

Specifically, in the case that there is a problem with the first capacitor 331, an open circuit occurs in which the first capacitor 331 is electrically disconnected from the power line, so that the voltage rectified by the rectifier 320 is not charged to the first capacitor 331.

In this case, there may be a periodic section in which no current iL flows through the inductor 332, and as illustrated in FIG. 9, there may be a periodic section I in which no detection signal detected by the inductor 332 exists.

The control circuit 350 may receive the detection signal through the first terminal 351 and obtain whether there is a section in which the detection signal is not received.

The control circuit 350 may obtain whether there is an abnormality in the first capacitor 331 based on the section I in which the detection signal is not received.

In the case that there is an abnormality in the first capacitor 331, the control circuit 350 may generate the second switching control signal CS2 having the constant level Lev3 and output the second switching control signal CS2 to the switch 334 through the second terminal 352. The switch 334 may be continuously turned off by the constant level Lev3 of the second switching control signal CS2. That is, the operation of the switch 334 may be continuously stopped.

Since the switch 334 is continuously turned off, the driving frequency of the switch 334 does not exist. Accordingly, the driving frequency of the switch 334 no longer resonates with the cutoff frequency of the EMI filter 310, so that the heat generation of the EMI filter 310 is released and the temperature of the EMI filter 310 is lowered, so that a fire of the EMI filter 310 itself or a fire of the PCB substrate or board is prevented, thereby improving product reliability.

Figure 11:
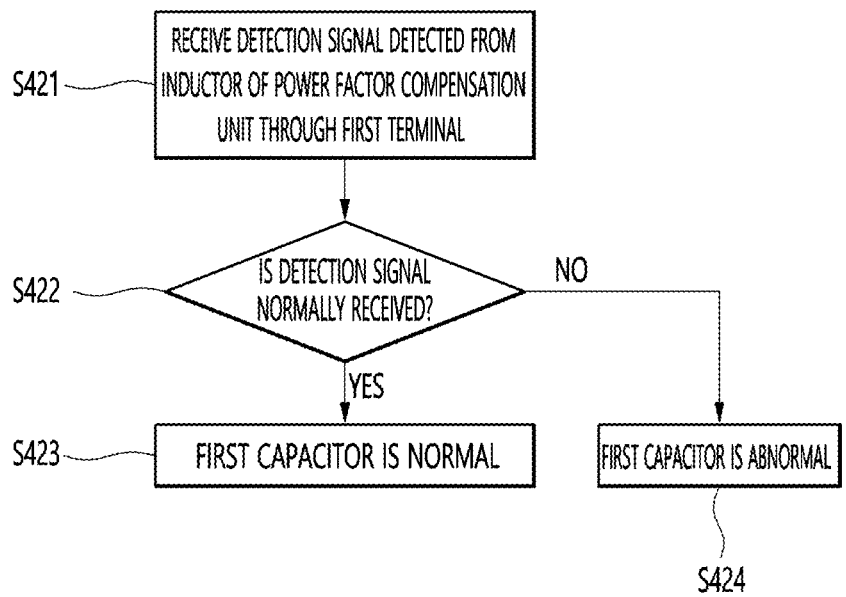
FIG. 11 is a flowchart for describing a method for determining whether the first capacitor of the power factor compensation unit is abnormal.

FIG. 11 is a flowchart for describing a method for determining whether the first capacitor of the power factor compensation unit is abnormal. FIG. 11 may be a flowchart for describing step S413 in FIG. 10 in detail.

As shown in FIG. 11, the control circuit 350 may receive the detection signal detected from the inductor 332 of the power factor compensation unit 330 through the first terminal 351 (step S321).

The detection signal may vary depending on the intensity of the current iL flowing in the inductor 332. That is, as the current iL flowing in the inductor 332 increases, the detection signal may increase, and as the current iL flowing in the inductor 332 decreases, the detection signal may decrease.

The control circuit 350 may obtain whether the detection signal is normally received (step S422).

For example, when the first capacitor 331 is normal, as shown in FIG. 5, the current iL flowing in the inductor 332 may increase or decrease. Accordingly, the detection signal detected in response to the current iL flowing in the inductor 332 may also increase or decrease.

For example, in the case that there is a problem with the first capacitor 331, as shown in FIG. 9, there may be a section in which the current iL does not flow in the inductor 332, and accordingly, there may be the section I in which the detection signal is not detected.

The control circuit 350 may obtain whether the detection signal is normally received through the first terminal 351.

For example, in the case that the detection signal received through the first terminal 351 periodically increases or decreases as shown in FIG. 5, the control circuit 350 may determine that the first capacitor 331 is normal (step S422).

For example, in the case that the detection signal received through the first terminal 351 does not exist for a predetermined period I as shown in FIG. 9, and thus the detection signal is not received through the first terminal 351 during the corresponding period I, the control circuit 350 may determine that there is a problem with the first capacitor 331 (step S424).

A method for determining an abnormality of the first capacitor will be described with reference to FIGS. 12 to 14.

Figure 12:
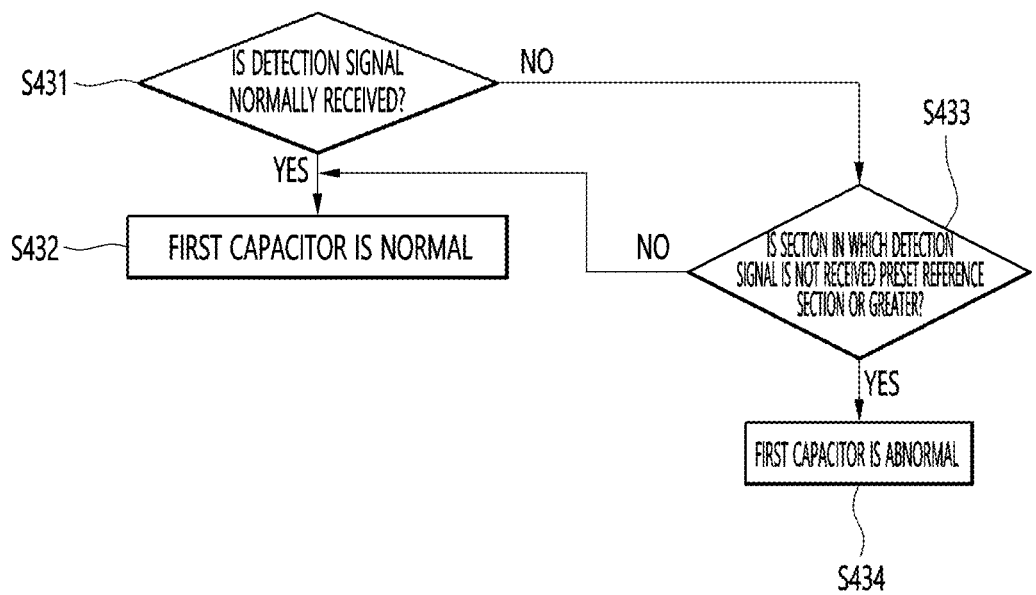
FIG. 12 is a flowchart for describing a first method for determining an abnormality of the first capacitor of the power factor compensation unit.

FIG. 12 is a flowchart for describing a first method for determining an abnormality of the first capacitor of the power factor compensation unit.

As shown in FIG. 12, the control circuit 350 may obtain whether the detection signal is normally received through the first terminal 351 (step S431).

For example, when the detection signal illustrated in FIG. 5 is received through the first terminal 351, the control circuit 350 may determine that the first capacitor 331 is normal (step S432).

For example, in the case that the detection signal illustrated in FIG. 9 is not received through the first terminal 351, the control circuit 350 may obtain whether there is a section in which the detection signal is not received. In the case that there is a section in which the detection signal is not received, the control circuit 350 may obtain whether the section in which the detection signal is not received is a preset reference section or greater (step S433).

In the case that the section in which the detection signal is not received is less than the preset reference section, the control circuit 350 may determine that the first capacitor 331 is normal due to temporary non-reception of the detection signal due to an external environment such as power instability.

In the case that the section in which the detection signal is not received is a preset reference section or greater, the control circuit 350 may determine that the first capacitor 331 is abnormal (step S434). That is, the control circuit 350 may determine that there is a problem with the first capacitor 331, and that the open is caused by an external factor such as a crack due to an external impact, or a component failure such as a capacity reduction due to an internal foreign substance.

Figure 13:
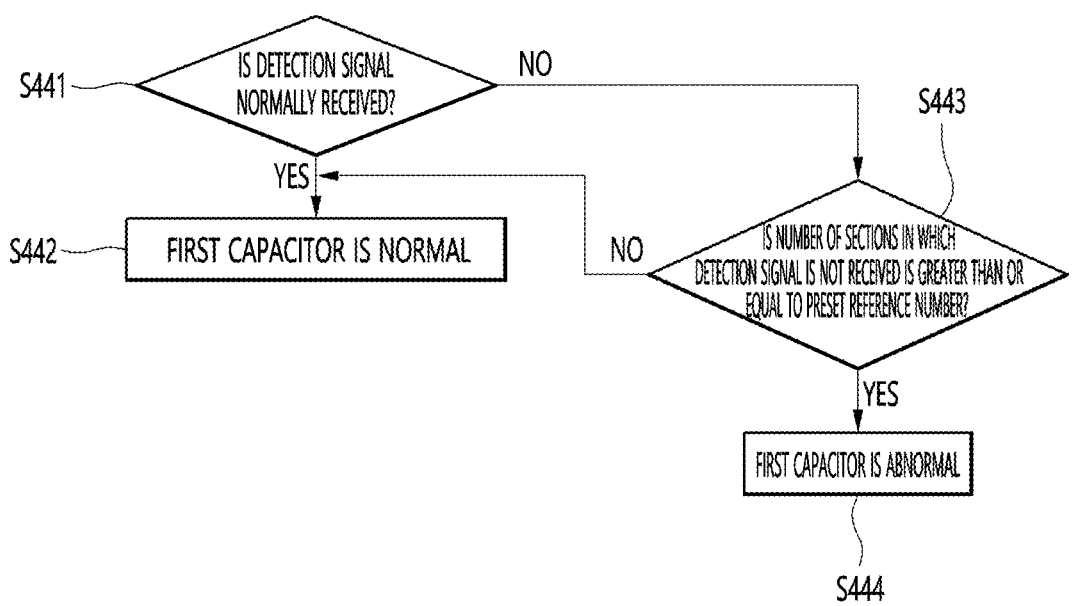
FIG. 13 is a flowchart for describing a second method for determining a problem with the first capacitor of the power factor compensation unit.

FIG. 13 is a flowchart for describing a second method for determining a problem with the first capacitor of the power factor compensation unit.

In FIG. 13, steps S441 and S442 are the same as steps S431 and S432 illustrated in FIG. 12, so the detailed description thereof is omitted.

As illustrated in FIG. 13, when the detection signal illustrated in FIG. 9 is not received through the first terminal 351, the control circuit 350 may obtain whether there is a section in which the detection signal is not received. When there is the section in which the detection signal is not received, the control circuit 350 may obtain whether there is the section in which the detection signal is not received repeatedly. The control circuit 350 may obtain whether the number of sections in which the detection signal is not received is greater than or equal to a preset reference number (step S443).

In the case that the number of sections in which the detection signal is not received is less than the preset reference number, the control circuit 350 may determine that the first capacitor 331 is normal due to temporary non-reception of the detection signal due to an external environment such as power instability.

In the case that the number of sections in which the detection signal is not received is less than the preset reference number, the control circuit 350 may determine that the first capacitor 331 is abnormal (step S444). That is, the control circuit 350 may determine that there is a problem with the first capacitor 331, for example, an open is caused by an external factor such as a crack due to an external impact or a component defect such as a decrease in capacity due to an internal foreign substance.

Figure 14:
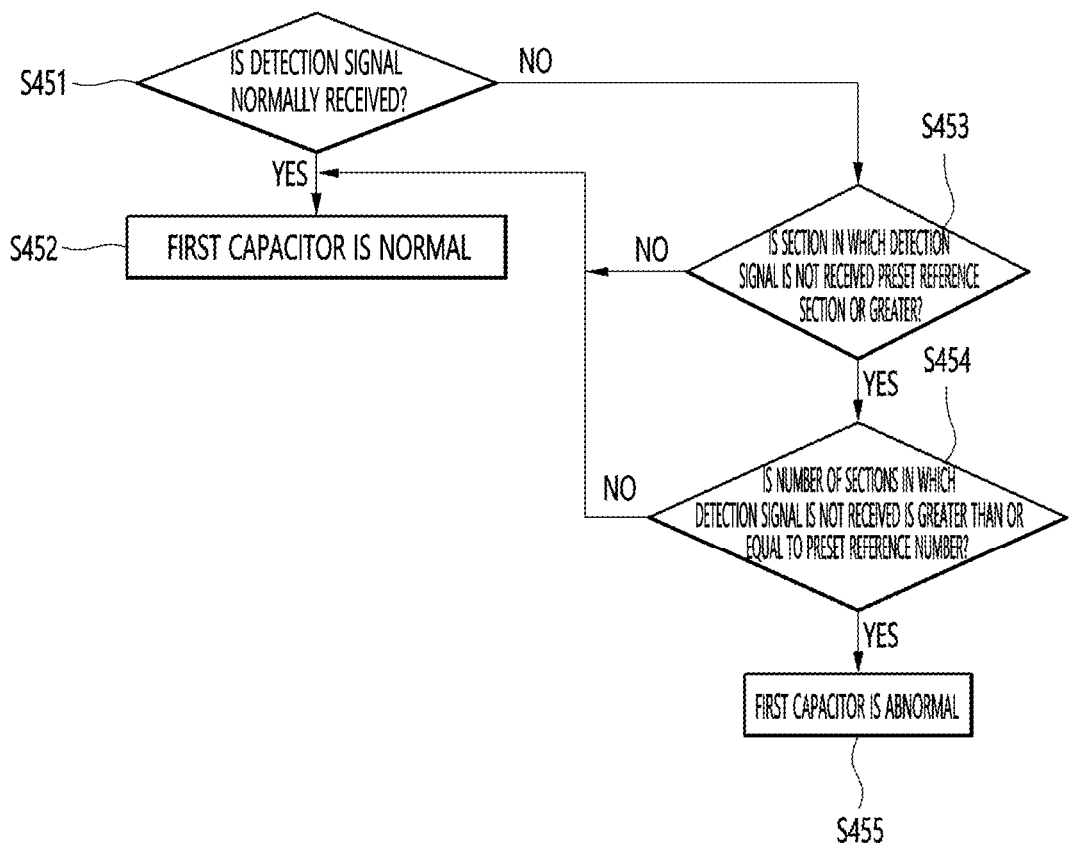
FIG. 14 is a flowchart for describing a third method for determining an abnormality of the first capacitor of the power factor compensation unit.

FIG. 14 is a flowchart for describing a third method for determining an abnormality of the first capacitor of the power factor compensation unit.

In FIG. 14, step S451 is identical to step S431 of FIG. 12 and step S441 of FIG. 13, and step S452 of FIG. 14 is identical to step S432 of FIG. 12 and step S442 of FIG. 13, so the detailed description is omitted.

In addition, FIG. 14 includes both step S433 of FIG. 12 and step S443 of FIG. 13, so step S453 may be identical to step S433 of FIG. 12, and step S454 may be identical to step S443 of FIG. 13.

For example, in the case that there is a section where the detection signal is not received through the first terminal 351, the control circuit 350 may obtain whether the section where the detection signal is not received is a preset reference section or greater (step S453).

In the case that the section where the detection signal is not received is shorter than the preset reference section, the control circuit 350 may determine that the first capacitor 331 is normal.

In the case that the section where the detection signal is not received is the preset reference section or greater, the control circuit 350 may obtain whether the number of sections where the detection signal is not received is greater than or equal to a preset reference number (step S454).

In the case that the number of sections where the detection signal is not received is less than or equal to a preset reference number, the control circuit 350 may determine that the first capacitor 331 is normal.

In the case that the number of sections in which the detection signal is not received is greater than the preset reference number, the control circuit 350 may determine that there is a problem with the first capacitor 331 (step S455).

Figure 15:
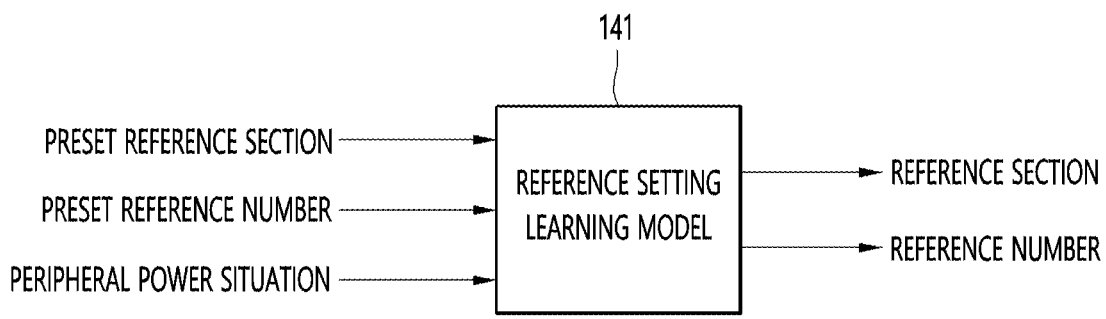
FIG. 15 illustrates a reference setting learning model according to an embodiment.
Figure 16:
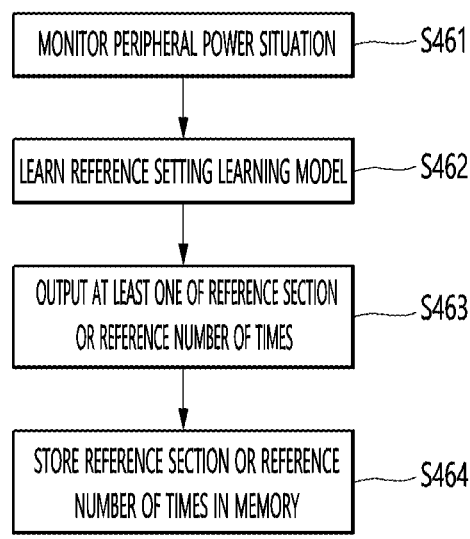
FIG. 16 is a flowchart for describing a reference setting method using the reference setting learning model according to an embodiment.

Referring to FIGS. 15 and 16, a method for optimizing the reference section or reference number of times using the reference setting learning model 141 is described.

FIG. 15 illustrates a reference setting learning model according to an embodiment.

As shown in FIG. 15, the reference setting learning model 141 may be stored in the memory 140 shown in FIG. 2. The reference setting learning model 141 may be trained by inputting the reference section and the reference number of times, and an optimized reference section or reference number of times may be output. Through such repeated learning, the reference setting learning model 141 that outputs the optimal reference section or reference number of times may be constructed and stored in the memory 140.

The reference setting learning model 141 of the embodiment may be constructed using an ANN Artificial Neural Network, an ANN Artificial Neural Network, a CNN Convolution Neural Network, and the like, but is not limited thereto.

FIG. 16 is a flowchart for describing a reference setting method using the reference setting learning model according to an embodiment.

Referring to FIG. 3 and FIG. 16, the control circuit 350 may monitor an external situation as the power supply device 300 operates (step S461). Here, the external situation may be a peripheral power situation.

Various sensors, not shown, may be installed at various locations of the power supply device 300 or the display device, so that the peripheral power situation may be monitored.

The control circuit 350 may learn the reference setting learning model 141 by inputting a preset base group section, a preset reference number of times, and the monitored peripheral power situation (step S462), and the control circuit 350 may output at least one of the reference section or the reference number of times from the reference setting learning model 141 as a learning result (step S463), and store the output reference section or the reference number of times in the memory 140 (step S464).

Whenever the surrounding power situation changes, the reference section or reference number of times is learned by the reference setting learning model 141, and the reference section or reference number of times may be updated, and the updated reference section or reference number of times may be stored in the memory 140.

As described above, whenever the surrounding power situation changes, the reference section or reference number of times may be learned by the reference setting learning model 141, and the updated reference section or reference number of times may be stored in the memory 140.

Figure 17:
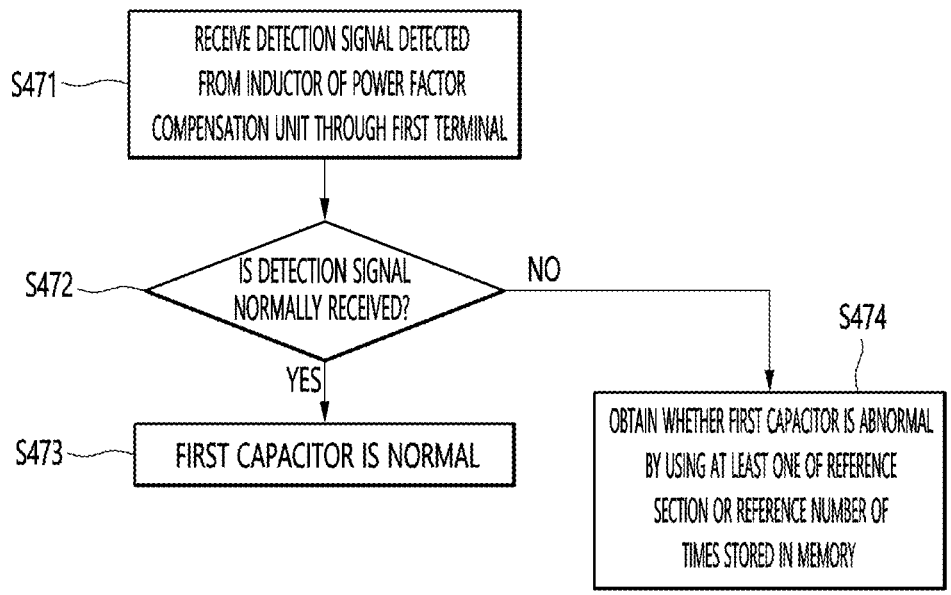
FIG. 17 is a flowchart for describing a method for determining whether the first capacitor of the power factor compensation unit is abnormal using the criteria set in FIG. 16.

FIG. 17 is a flowchart for describing a method for determining whether the first capacitor of the power factor compensation unit is abnormal using the criteria set in FIG. 16.

As illustrated in FIG. 17, the control circuit 350 may obtain whether the detection signal detected from the inductor 332 of the power factor compensation is received through the first terminal 351 (step S471), and obtain whether the detection signal is normally received through the first terminal 351 (step S472).

In the case that the detection signal is normally received through the first terminal 351, the control circuit 350 may determine that the first capacitor 331 is normal (step S473).

In the case that the detection signal is not normally received through the first terminal 351, the control circuit 350 may obtain whether the first capacitor 331 is abnormal by using at least one of the reference section or reference number of times stored in the memory 140 (step S474).

For example, in the case that the detection signal is not received, the control circuit 350 may obtain whether the section in which the detection signal is not received is greater than or equal to the reference section stored in the memory 140, and in the case that the section in which the detection signal is not received is greater than or equal to the reference section stored in the memory 140, it may determine that the first capacitor 331 is abnormal.

For example, in the case that the detection signal is not received, the control circuit 350 may obtain whether the number of repetitions of the section in which the detection signal is not received is greater than or equal to the reference number stored in the memory 140, and in the case that the number of repetitions of the section in which the signal is not received is greater than or equal to the reference number stored in the memory 140, it may determine that there is a problem with the first capacitor 331.

In the case that the power supply and demand situation of the space, surrounding area, or country in which the display device of the embodiment is installed is unstable, the input voltage Vin input to the rectifier 320 is unstable. In this case, in the case that the input voltage Vin is unstable, there may be a section in which the detection signal is not detected even though the first capacitor 331 is normal.

Therefore, in the case that the surrounding power situation is not considered, even though the first capacitor 331 is normal, it may be mistakenly determined that there is a problem with the first capacitor 331, and the operation of the switch 334 may be stopped, which may unintentionally cause a display malfunction of the display device.

In the embodiment, the optimal reference section or reference number of times may be obtained by learning these pieces of information using the reference setting learning model 141 by considering not only the section where the detection signal is not detected and the number of repetitions of the section, but also the surrounding power situation. Accordingly, by preventing misjudgment of the abnormality of the first capacitor 331 by considering the surrounding power situation, and by more accurately determining the presence or absence of an abnormality of the first capacitor 331 by using the optimal reference section or reference number of times, product reliability may be improved.

INDUSTRIAL APPLICABILITY

The embodiment may be applied to all electronic devices that use voltages generated by power factor compensation.

In particular, the embodiment may be applied to large-area displays where power factor compensation is essential due to high power consumption.

What is claimed is:

1. A power supply device comprising:
an EMI filter;
a rectifier configured to rectify an AC voltage passing through the EMI filter;
a power factor compensation unit configured to compensate power factor of the rectified voltage and output a DC voltage; and
a control circuit configured to control the power factor compensation unit,
wherein the power factor compensation unit includes:
a capacitor connected to an output terminal of the rectifier;
an inductor connected in parallel with the capacitor; and
a switch connected in parallel with the inductor;
wherein the control circuit is configured to:
obtain whether the capacitor is abnormal based on a detection signal detected from the inductor, and
control switching of the switch differently depending on whether the capacitor is abnormal.

2. The device of claim 1, wherein the control circuit includes:
a first terminal configured to receiving a detection signal detected from the inductor; and
a second terminal configured to output a first switching control signal or a second switching control signal generated based on the detection signal to the switch.

3. The device of claim 1, wherein the control circuit is configured to:
control the switching of the switch according to the first switching control signal to charge and discharge energy to the inductor when the capacitor is normal.

4. The device of claim 3, wherein the first switching control signal includes a control signal that periodically has a first level and a second level different from the first level.

5. The device of claim 2, wherein the control circuit is configured to:
stop the operation of the switch according to the second switching control signal based on there being a problem with the capacitor.

6. The device of claim 5, wherein the second switching control signal includes a control signal having a constant level.

7. The device of claim 2, wherein the control circuit is configured to:
acquire whether the detection signal detected from the inductor is received through the first terminal, and
based on the detection signal being not received, and based on the section in which the detection signal is not received being longer than a preset reference section, determine that there is a problem with the capacitor.

8. The device of claim 7, wherein the control circuit is configured to:
based on the number of times the detection signal is not received being a preset reference number or greater, determine that there is a problem with the capacitor.

9. The device of claim 2, further comprising a memory configured to store a reference setting learning model,
wherein the control circuit is configured to:
monitor a surrounding power situation,
learn the reference setting learning model by inputting a preset reference section, a preset reference number of times, and the monitored surrounding power situation, and output at least one of the reference section or the reference number of times, and
store the outputted reference section or the reference number of times in the memory.

10. The device of claim 9, wherein the control circuit is configured to:
acquire whether the detection signal detected from the inductor is received through the first terminal, and
based on the detection signal being not received, acquire whether the capacitor is abnormal by using at least one of the reference section or the reference number of times stored in the memory.

11. The device of claim 1, wherein the abnormality of the capacitor indicates an open of the capacitor.

12. A method for operating a power supply device, comprising:
rectifying an AC voltage passing through an EMI filter by a rectifier;
outputting a DC voltage by compensating power factor of the rectified voltage by a power factor compensation unit; and
controlling the power factor compensation unit by a control circuit,
wherein the power factor compensation unit includes:
a capacitor connected to an output terminal of the rectifier;
an inductor connected in parallel with the capacitor; and
a switch connected in parallel with the inductor;
wherein controlling the power factor compensation unit includes:
obtaining whether the capacitor is abnormal based on a detection signal detected from the inductor, and
controlling switching of the switch differently depending on whether the capacitor is abnormal.

13. The method of claim 12, wherein controlling the power factor compensation unit includes:
receiving a detection signal detected from the inductor through a first terminal of the control circuit; and
outputting a first switching control signal or a second switching control signal generated based on the detection signal to the switch through a second terminal of the control circuit.

14. The method of claim 13, wherein controlling the power factor compensation unit includes:

controlling switching of the switch according to the first switching control signal to charge and discharge energy to the inductor when the capacitor is normal.

15. The method of claim 13, wherein controlling the power factor compensation unit includes:
stopping the operation of the switch according to the second switching control signal based on there being a problem with the capacitor.

16. The method of claim 13, wherein controlling the power factor compensation unit includes:
acquiring whether the detection signal detected from the inductor is received through the first terminal, and
based on the detection signal being not received, and based on the section in which the detection signal is not received being longer than a preset reference section, determining that there is a problem with the capacitor.

17. The method of claim 13, wherein controlling the power factor compensation unit includes:
acquiring whether the detection signal detected from the inductor is received through the first terminal, and
based on the number of times the detection signal is not received being a preset reference number or greater, determining that there is a problem with the capacitor.

18. The method of claim 13, wherein controlling the power factor compensation unit includes:
monitoring a surrounding power situation,
learning the reference setting learning model by inputting a preset reference section, a preset reference number of times, and the monitored surrounding power situation, and outputting at least one of the reference section or the reference number of times, and
storing the outputted reference section or the reference number of times in the memory.

19. The method of claim 18, wherein controlling the power factor compensation unit includes:
acquiring whether the detection signal detected from the inductor is received through the first terminal, and
based on the detection signal being not received, acquiring whether the capacitor is abnormal by using at least one of the reference section or the reference number of times stored in the memory.

20. A display device comprising:
a power supply device; and
a display configured to display an image using power of the power supply device,
wherein the power supply device includes:
an EMI filter;
a rectifier configured to rectify an AC voltage passing through the EMI filter;
a power factor compensation unit configured to compensate power factor of the rectified voltage and output a DC voltage; and
a control circuit configured to control the power factor compensation unit;
wherein the power factor compensation unit includes:
a capacitor connected to an output terminal of the rectifier;
an inductor connected in parallel with the capacitor; and
a switch connected in parallel with the inductor;
wherein the control circuit is configured to:
obtain whether the capacitor is abnormal based on a detection signal detected from the inductor, and
control switching of the switch differently depending on whether the capacitor is abnormal.

\* \* \* \* \*